United States Patent
Mazet et al.

(10) Patent No.: US 10,788,274 B2
(45) Date of Patent: Sep. 29, 2020

(54) CORROSION-RESISTANT HEAT EXCHANGER MATRIX AND METHOD OF MANUFACTURING SUCH A MATRIX

(71) Applicant: FIVES CRYO, Golbey (FR)

(72) Inventors: Thierry Mazet, Nancy (FR); Johan Dib, Igney (FR); Florian Henri Ernest Picard, Chamagne (FR)

(73) Assignee: FIVES CRYO, Golbey (FR)

( * ) Notice: Subject to any disclaimer, the term of this patent is extended or adjusted under 35 U.S.C. 154(b) by 467 days.

(21) Appl. No.: 15/522,666

(22) PCT Filed: Oct. 29, 2015

(86) PCT No.: PCT/EP2015/075176
§ 371 (c)(1),
(2) Date: Apr. 27, 2017

(87) PCT Pub. No.: WO2016/066771
PCT Pub. Date: May 6, 2016

(65) Prior Publication Data
US 2017/0314879 A1 Nov. 2, 2017

(30) Foreign Application Priority Data
Oct. 29, 2014 (FR) .................... 14 60399

(51) Int. Cl.
*B23K 1/008* (2006.01)
*F28F 19/00* (2006.01)
(Continued)

(52) U.S. Cl.
CPC .............. *F28F 19/06* (2013.01); *B23K 1/008* (2013.01); *B23K 1/0012* (2013.01);
(Continued)

(58) Field of Classification Search
None
See application file for complete search history.

(56) References Cited

U.S. PATENT DOCUMENTS

| 4,645,119 A | 2/1987 | Haramaki et al. |
| 6,800,150 B2 | 10/2004 | Totino et al. |

(Continued)

FOREIGN PATENT DOCUMENTS

| CN | 1019623785 | 1/2010 |
| CN | 101842657 | 9/2010 |

(Continued)

OTHER PUBLICATIONS

International Search Report for PCT/EP2015/075176, dated Apr. 3, 2016.
(Continued)

*Primary Examiner* — Devang R Patel
(74) *Attorney, Agent, or Firm* — B. Aaron Schulman, Esq.; Stites & Harbison, PLLC

(57) ABSTRACT

A metal matrix (2) for a heat exchanger (1), comprising a stack of components (4, 5, 6), in particular etched plates or corrugations (4), separator sheets (5) and bars (6), or a combination of the two types of stack,
said components (4, 5, 6) being held relative to one another by layers of braze material (3), thereby ensuring the mechanical integrity of the matrix,
the matrix including fluid circulation passages (10) within it, each fluid circulation passage (10) having an inner wall provided to fully contain said fluid radially, characterized in that each inner wall is fully covered with a corrosion-resistant coating (7).
Preferred application to heat exchangers based on carbon steel or stainless steel.

4 Claims, 4 Drawing Sheets

(51) Int. Cl.
*F28F 19/06* (2006.01)
*B23K 1/00* (2006.01)
*F28D 9/00* (2006.01)
*F28F 21/08* (2006.01)
*F28F 3/02* (2006.01)

(52) U.S. Cl.
CPC ............ *F28D 9/0062* (2013.01); *F28F 3/025* (2013.01); *F28F 21/089* (2013.01); *F28F 2275/04* (2013.01)

(56) References Cited

U.S. PATENT DOCUMENTS

| | | | |
|---|---|---|---|
| 7,179,540 | B2 | 2/2007 | Tada |
| 7,989,087 | B2 | 8/2011 | Suzuki et al. |
| 8,191,256 | B2* | 6/2012 | Carl ................ B23K 1/0012 29/890.046 |
| 10,384,313 | B2* | 8/2019 | Persson ................ B23K 35/025 |
| 2002/0007938 | A1 | 1/2002 | Dietrich et al. |
| 2003/0201037 | A1 | 10/2003 | Totino et al. |
| 2004/0072013 | A1 | 4/2004 | Tada |
| 2006/0086486 | A1 | 4/2006 | Sudo |
| 2008/0003451 | A1 | 1/2008 | Suzuki et al. |
| 2010/0170669 | A1* | 7/2010 | Jaworowski ......... B23K 35/286 165/173 |
| 2010/0224351 | A1 | 9/2010 | Sasaoka et al. |
| 2011/0192583 | A1 | 8/2011 | Sakashita et al. |
| 2013/0224069 | A1 | 8/2013 | Otobe et al. |
| 2013/0299564 | A1 | 11/2013 | Steiner et al. |
| 2014/0079881 | A1* | 3/2014 | Botstein ............... B23K 35/325 427/205 |

FOREIGN PATENT DOCUMENTS

| | | |
|---|---|---|
| DE | 102011103641 | 12/2012 |
| EP | 0785045 | 7/1997 |
| EP | 1094291 | 4/2001 |
| FR | 2930464 | 10/2009 |
| JP | H01217197 | 8/1989 |
| JP | A-1989217197 | 9/1989 |
| JP | A-1997201694 | 8/1997 |
| JP | A-2000171188 | 6/2000 |
| JP | 2004025251 | 1/2004 |
| JP | A-2008190771 | 8/2008 |
| WO | WO-2006081923 | 8/2006 |

OTHER PUBLICATIONS

Preliminary Search Report for FR 1460399, completed Sep. 9, 2015.

* cited by examiner

STATE OF THE ART

STATE OF THE ART

CORROSION-RESISTANT HEAT EXCHANGER MATRIX AND METHOD OF MANUFACTURING SUCH A MATRIX

The invention relates to a metallic heat exchanger matrix, comprising a stack of components, in particular etched plates or corrugations, separator sheets and bars, or a combination of the two types of stack, said components being held relative to one another by layers of braze material, thereby ensuring mechanical integrity of the matrix, the matrix including therein fluid circulation passages, each fluid circulation passage having an inner wall provided to fully contain said fluid radially.

Figure 1:
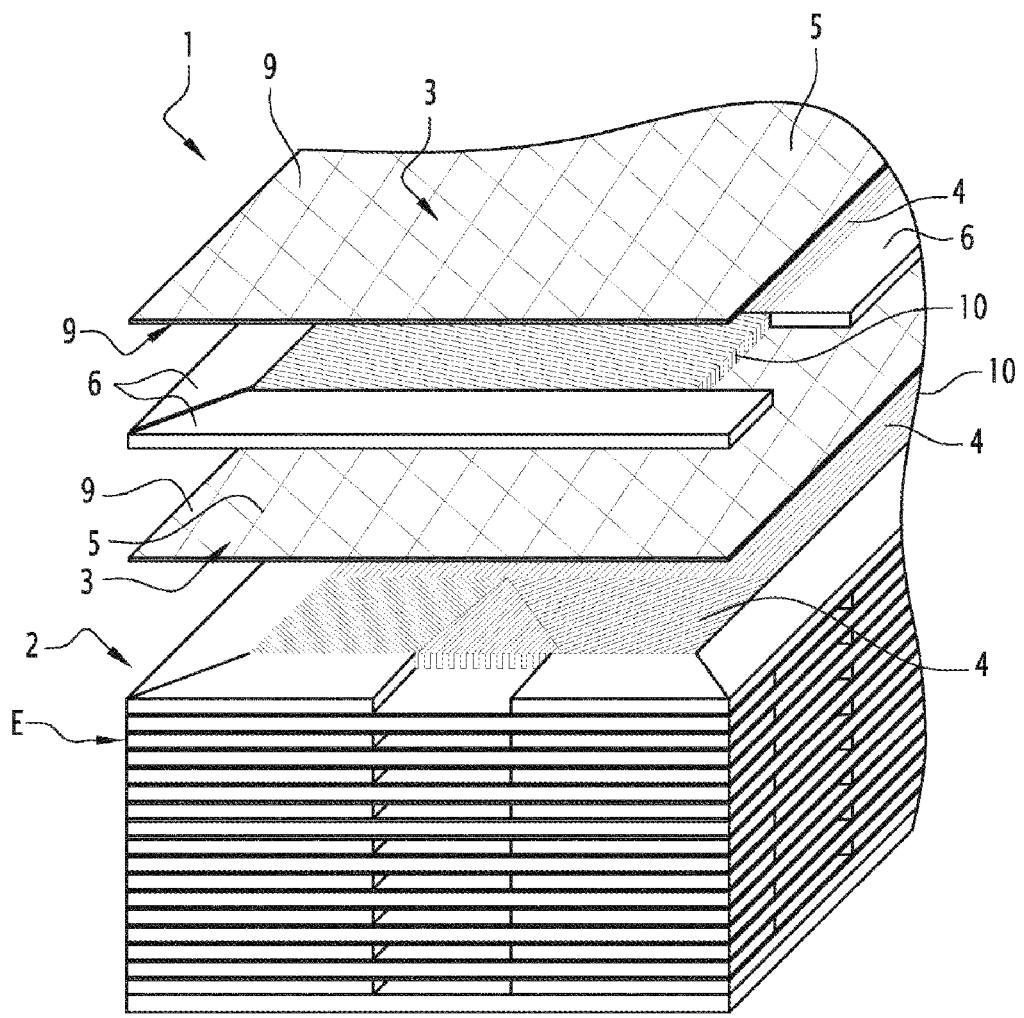

Such a matrix is known, and one example is shown in FIG. 1.

Heat exchangers with etched plates have a matrix obtained by a stack of plates on which etching has been done beforehand on one face. This etching defines a passage in which the fluids flow. The non-etched face of the plates is coated with a braze coating, which allows assembly by brazing in a single operation in a brazing furnace to obtain a matrix.

FIG. 1 illustrates an example of a matrix 2 of a heat exchanger 1 with corrugations 4, bars 6 and separator sheets 5. It is made up of a stack of sets of corrugations 4, also called "corrugated mats", bars 6 and separator sheets 5. The separator sheets 5 are coated on each face 9 with a layer of braze material 3, shown by crosshatching. The faces 9 of the separator sheets 5 can thus be qualified as zones 9 provided to provide the mechanical connection between the components of the matrix 2. The sheets 5 are stacked, spaced apart by corrugated mats having rectangular bars 6 on their perimeter, to form a matrix.

Figure 2:
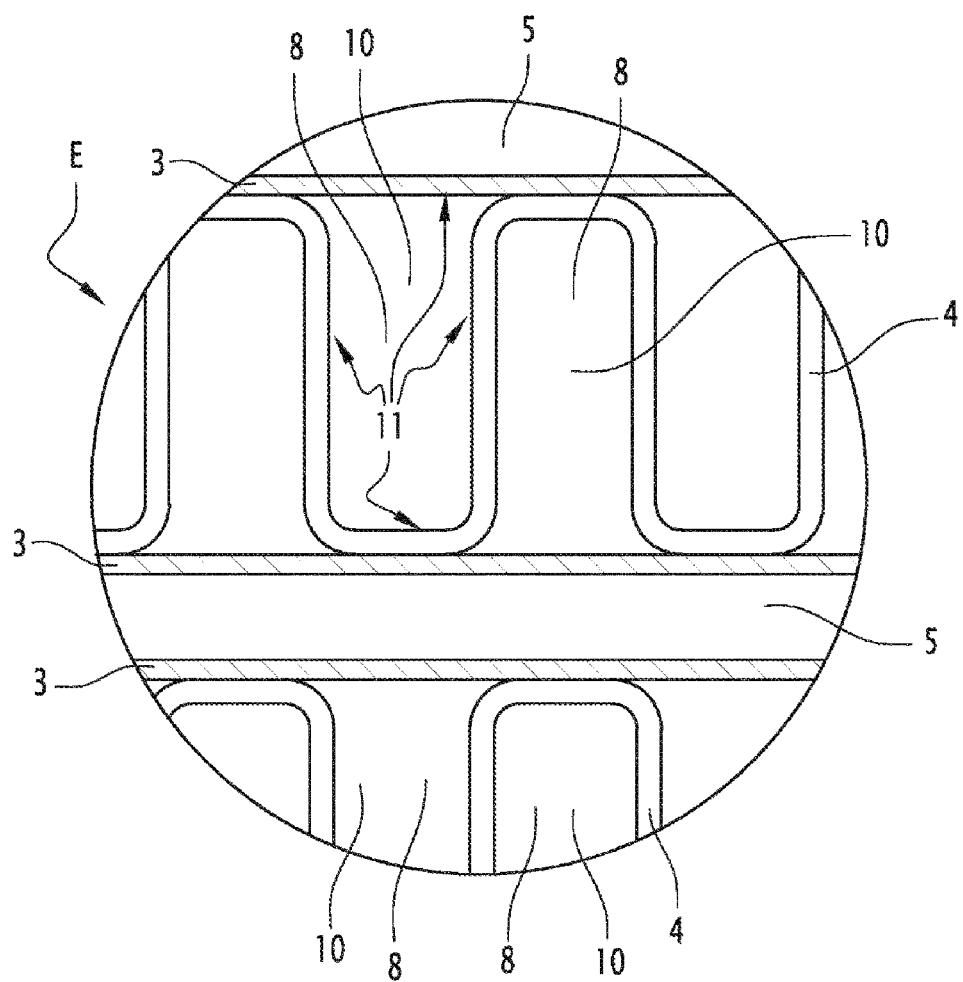

In reference to FIG. 2, the spaces E between the separator sheets 5 constitute passages 10 in which the fluids circulate. Each fluid circulation passage 10 has an inner wall 11 defining the passage 10 and provided to contain said fluid inside the passage 10. The inner wall 11 covers the entire inner perimeter of the passage 10 and preferably also the inner surface of the bars.

This stack is next assembled in a single operation in a brazing furnace to obtain a matrix.

The matrix generally comprises a first and last plate with a greater thickness than the etched plates or the separator sheets 5.

Fluid supply heads are added to the matrix to form an exchanger. Intermediate connecting pieces between the matrix and the supply heads can be used.

The number and design of the passages 10 in the exchanger 1 are suitable for the performance levels that must be achieved by the device.

The choice of the material used to manufacture this equipment is dictated by mechanical integrity and durability considerations. For equipment subject to corrosive environments, it becomes necessary to adapt the material solution to the environment, which most often requires the use of costly materials whose formats are not always adapted to manufacturing exchangers with separator sheets, bars and corrugations or etched plates. The use of low-cost materials that are readily available in the desired format or shapes can only be considered if they are protected from corrosion. Furthermore, protecting the equipment from corrosion makes it possible to extend its field of use while guaranteeing it better longevity.

It is possible to consider post-brazing anticorrosion treatment for such equipment, but this is difficult due to the inaccessibility of the brazed structure and the tortuosity of the network formed by the corrugated mats positioned between the separator sheets. Few techniques potentially make it possible to produce this type of protection, in particular when this equipment operates at high temperatures. Autocatalytic electrolytic depositions can only be considered if the operating temperature of this equipment does not exceed 200° C., beyond which temperature the corrosion resistance of these coatings becomes ineffective. Chemical processing (pack cementation) could be an alternative to electrochemical methods, but aside from mastering the introduction and distribution in the structure of the matrix of precursor elements to the establishment of the anticorrosion coating, it requires an additional heat treatment generally done at a high temperature. Done at temperatures close to the melting temperature of the brazing alloy, the heat treatment may be detrimental to the metallurgical quality of the assembly, in particular by initiating premature aging of the braze material. Furthermore, using a post-brazing anticorrosion coating in this type of architecture does not make it possible to account for the quality of the coating thus obtained.

Performing anticorrosion treatment prior to brazing etched plates or corrugated mats, separator sheets and bars can only be considered if the latter is not detrimental to subsequent brazing operations. Conversely, the qualities of the anticorrosion coating must not be deteriorated during the brazing operation.

The invention makes it possible to offset these shortcomings. One aim of the invention is in particular to propose a heat exchanger matrix and an associated manufacturing method ensuring good corrosion resistance of the matrix in applications where it is traversed by one or several corrosive fluids, in particular at a high temperature, for example exceeding 200° C. The matrix according to the invention must also be able to be used in heat exchanges involving saltwater, such as seawater.

The above aims are achieved with a heat exchanger matrix as defined above, characterized in that each inner wall is completely covered with an anticorrosion coating.

By completely covering the inner walls of the fluid passages with an anticorrosion coating, a corrosive fluid traversing the matrix can no longer corrode the internal parts of the matrix.

According to preferred embodiments, the matrix according to the invention includes one, several or all of the following, according to all technically possible combinations:
- the anticorrosion coating has a thickness smaller than or equal to 100 μm;
- each inner wall of all of its fluid circulation passages is completely covered with the anticorrosion coating;
- the anti-corrosion coating is made up of the same material as the braze material, in particular an alloy based on Nickel and Chromium, preferably an alloy of Nickel, Chromium, Boron and Silicon (NiCrBSi);
- the braze material is made up of a first alloy, and the anticorrosion coating is made up of a second alloy different from the first alloy and having a melting temperature not differing from that of the first alloy by more than 50° C.;
- the second alloy belongs to the same family of alloys as the first alloy, in particular the alloy family based on Nickel and Chromium, the second alloy preferably being an alloy of Nickel, Chromium and Silicon (NiCrSi) or an alloy of Nickel, Chromium, Silicon and Phosphorus (NiCrSiP).

The above aims are also achieved with a method for manufacturing a brazed metal matrix for a heat exchanger suitable for the circulation of a corrosive fluid within it, the matrix comprising a stack of components, in particular etched plates or corrugations, separator sheets and bars, or a combination of the two types of stack, some of said components defining channels conveying said corrosive fluid, the method comprising the following consecutive steps:

a) providing said components of the matrix;
b) depositing a layer of braze material on zones of said components provided to ensure the mechanical connection between the components;
c) covering said channels, and preferably the bars, with an anticorrosion layer;
d) stacking the components, thus forming the matrix;
e) placing the stacked matrix in a brazing furnace; and
f) having the matrix undergo a heat cycle, thus brazing the matrix and covering its fluid passages with an anticorrosion coating in a single operation.

According to preferred embodiments, the method according to the invention includes one, several or all of the following, according to all technically possible combinations:

the layer of braze material and the anticorrosion layer are made up of the same product;
the layer of braze material and the anticorrosion layer are made up of two different products whose melting temperature difference does not exceed 50° C.;
the anticorrosion layer is a suspension comprising a liquid solvent, a wetting agent, and a metal alloy powder, in particular a powder of an alloy based on Nickel and Chromium;
step c) is carried out by quenching said components with channels in a bath of an anticorrosion product, then removing the components from the bath;
the anticorrosion product is present in the bath in the form of scattered grains with a size ranging from about 5 to 100 μm, preferably from about 20 to 65 μm, the grain load rate in the bath being comprised between about 30 and 60 vol %, the removal being done at a speed comprised between about 5 and 30 mm/s;
the heat cycle according to step f) begins with a first phase for heating the stacked matrix to a predetermined drying temperature, followed by a second phase for keeping the matrix at the drying temperature during a predetermined drying duration, thereby drying the anticorrosion layer;
the second phase is followed by a third phase for heating the stacked matrix to a predetermined brazing temperature higher than the drying temperature, followed by a fourth phase for keeping the matrix at the brazing temperature for a predetermined brazing duration, thereby brazing the matrix and thereby synthesizing the anticorrosion coating;
step c) is preceded by stripping the surfaces of said channels.

Figure 3:
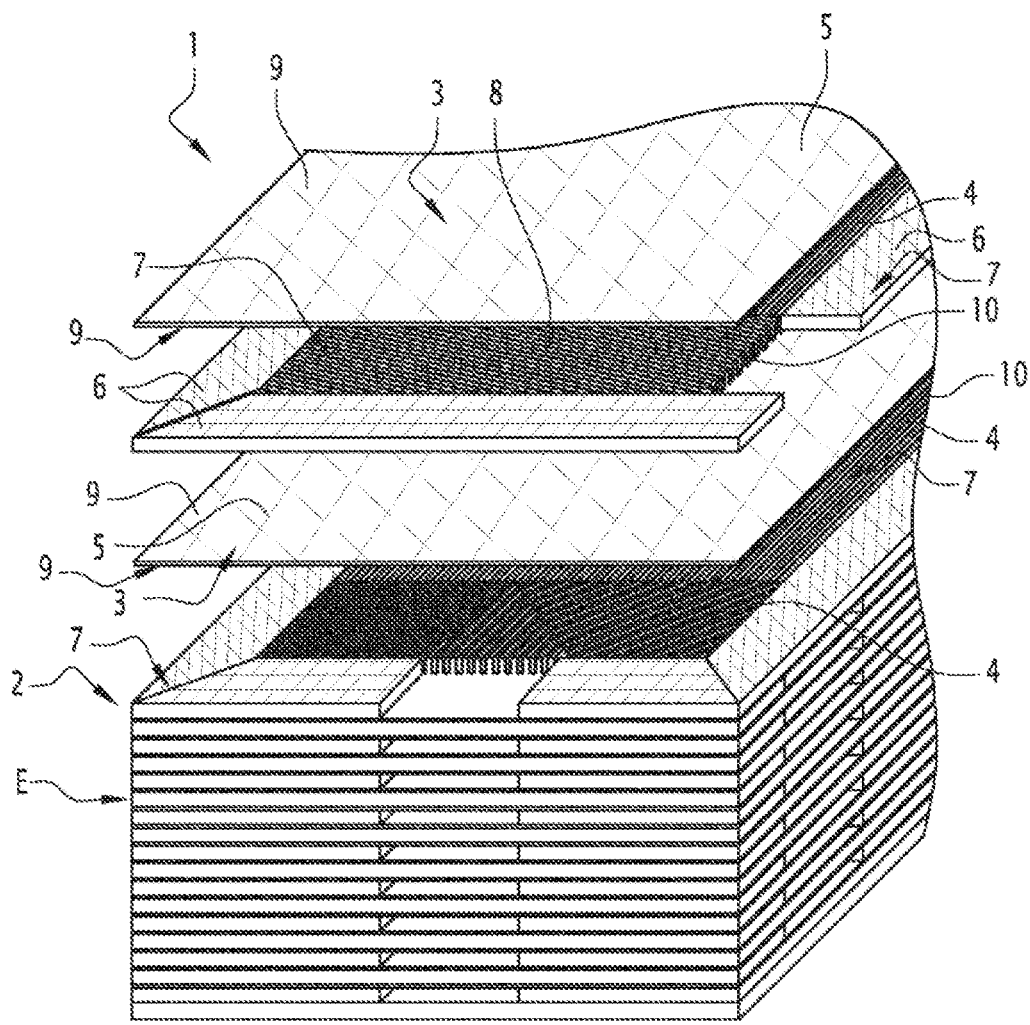
Figure 4:
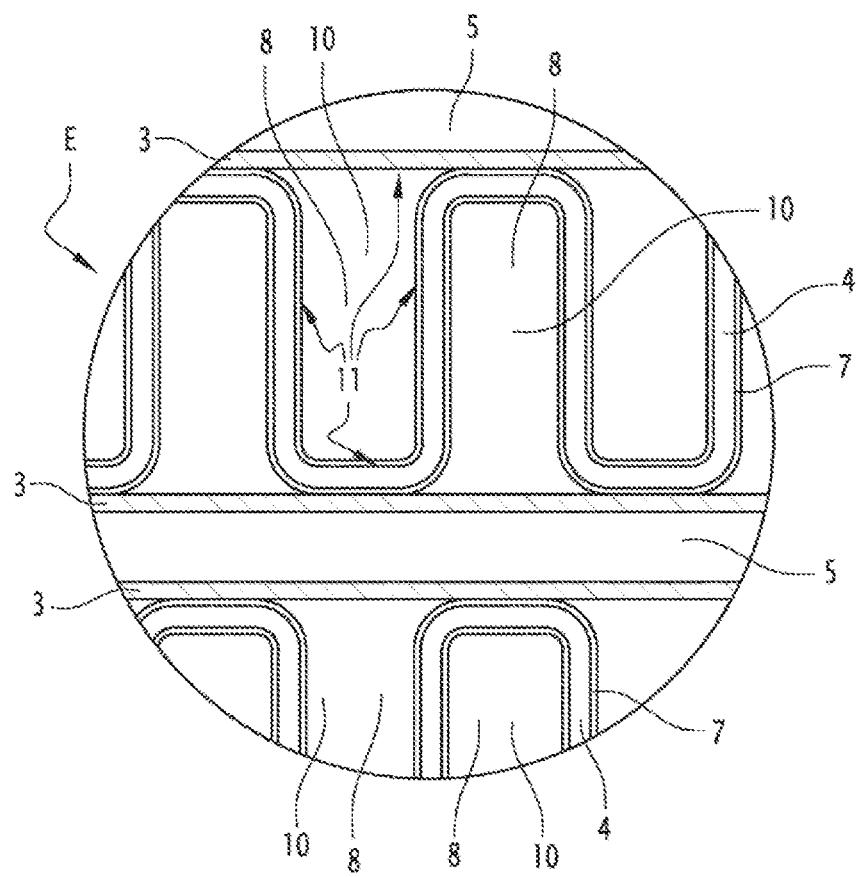

The invention will be better understood upon studying the following detailed description, provided solely as an example and non-limiting, in reference to the figures, in which:

FIG. 1 is an exploded perspective view of a heat exchanger matrix according to the state of the art;
FIG. 2 is a detailed view of fluid passages of the matrix of FIG. 1, before brazing of the matrix;
FIG. 3 is an exploded perspective view of a heat exchanger matrix according to the invention; and
FIG. 4 is a detailed view of fluid passages of the matrix of FIG. 3 according to the invention, before brazing of the matrix.

Reference is now made to FIG. 3. Hereinafter, in order to simplify the description of the invention, reference will be made to an exchanger 1 whose matrix 2 is made up of a stack of corrugations 4, bars 6 and separator sheets 5, with the understanding that the invention also applies to a matrix made up of a stack of etched plates, or a matrix comprising a combination of these two stacks.

It will be noted that the corrugations 4 and the etched plates (not shown) of these types of matrices define channels 8 for conveying fluid.

According to the invention, the anticorrosion coating is deposited on the pieces to be assembled (in particular on the corrugations 4 and the bars 6) before the stacking of the matrix, and therefore before the brazing.

According to a first exemplary embodiment of the invention, the anticorrosion coating 7, identified on the bars 6 by crosshatching, and on the corrugations 4 by a thick line, is made up of the same alloy as the brazing alloy. The anticorrosion coating 7 can be better distinguished on the corrugations 4 in the detailed view shown by FIG. 4. For each fluid circulation passage 10, the anticorrosion coating 7 is present on the three surfaces of the inner wall 11 made up of corrugations parts. For the fourth surface of the inner wall 11 made up of a separator sheet part 5, the anticorrosion coating is made by the braze material 3. The anticorrosion coating is also present on the inner faces of the bars 6 that are in contact with the fluids traversing the matrix 2.

According to one alternative embodiment, the anticorrosion coating 7 is made up of an alloy from the same family as the brazing alloy having a melting temperature close to that of the braze material 3.

Alloy family refers to alloys whose major component elements are substantially identical. For example, for a brazing alloy primarily made up of Nickel, Chromium, Boron and Silicon (NiCrBSi), the anticorrosion coating 7 can be made up of Nickel, Chromium and Silicon (NiCrSi) or Nickel, Chromium, Boron and Silicon (NiCrBSi) in different proportions, or of Nickel, Chromium, Silicon and Phosphorus (NiCrSiP).

The anticorrosion coating 7 assumes the form of a thin layer, preferably with a thickness of approximately or less than one hundred microns.

The anticorrosion coating 7 can for example be deposited by dipping the components 4, 5, 6 of the matrix 2 in a liquid bath and removing them therefrom (dip coating). It is then developed from a suspension made up of an organic or aqueous solvent, a wetting agent and a powder of the anticorrosion alloy whereof the grain particle size is chosen between 5 and 100 μm, and more advantageously between 20 and 65 μm.

The powder can have a composition different from that of the braze material 3 as long as the melting temperature of the synthesized anticorrosion coating 7 remains close to that of the braze material. It may be necessary to add an activating agent, for example sodium tetraborate ($Na_2B_4O_7$), for an alloy powder of Nickel, Chromium, Boron and Silicon (NiCrBSi).

Advantageously, the temperature deviation on the melting point between the braze material 3 and the synthesized anticorrosion coating 7 is smaller than 50° C.

The anticorrosion coating 7 is obtained from a mixture or layer deposited on the surface of the parts 4, 5, 6 after immersion in the bath. This anti-corrosion layer can, depending on the nature of the brazing alloy and the particle size of the alloy powder contained in the anticorrosion layer, be completed by a dispersing agent or by a binder.

Prior to immersion in the bath, a preparation of the surfaces of the components 4, 5, 6 of the matrix 2 may be necessary to ensure the quality of the anticorrosion coating.

According to another alternative, an activating agent may be added in the bath in order to allow the in situ deoxidation (stripping) of the coated surfaces on the one hand, and to improve the makeup of the coating on the other hand. To that end, a fluoride will preferably be chosen, such as potassium aluminum fluoride ($KAlF_4$), or a chloride with a high vapor tension, or a boron compound whose melting temperature is close to that of the braze material 3, for example sodium tetraborate ($Na_2B_4O_7$).

Adjusting the extraction speed of the components 4, 5, 6 of the matrix 2 from the bath and the solid filler level in this bath makes it possible to adjust the thickness of the anticorrosion layer deposit. Advantageously, the components 4, 5, 6 of the matrix 2 are removed from the bath in a substantially vertical position, or are placed temporarily in a substantially vertical position after they are removed from the bath, to allow the excess liquid to stream off of them. The removed components 4, 5, 6 can also be dried by air jet. Advantageously, the solid filler level in the bath will be chosen so as to be comprised between 30 and 60 vol % for the aforementioned particle sizes, and an extraction speed comprised between 5 and 30 mm/s.

In the brazing furnace, the anticorrosion layer is first dried during the temperature increase. This drying step, carried out during the brazing cycle, allows the evaporation of the organic or aqueous solvent from the anticorrosion layer in order to form a precursor anticorrosion coating. Preferably, the drying step consists of keeping the matrix 2 at a substantially isothermal drying temperature carried out between 350 and 500° C. for a predetermined drying time. The drying time is adjusted based on the size and weight of the matrix 2 to be treated. It is for example comprised between 2 and 6 hours for a matrix 2 weighing several hundred kilograms corresponding to a part measuring 25 cm×30 cm×200 cm.

The anti-corrosion coating 7 is next synthesized at the brazing temperature, i.e., the melting temperature of the brazing alloy, this melting temperature preferably, depending on the nature of the alloy used, being between 950° C. and 1200° C.

The metal phase being melted at the brazing temperature, it can then spread to form the anticorrosion coating 7, which, after cooling, will become a hard, adherent and corrosion resistant layer. In FIG. 3, this coating 7 is shown on the bars 6 by crosshatching, and on the corrugations 4 by a thick line.

The brazing cycle makes it possible on the one hand to melt the metal phase of the anticorrosion layer, and thus, by wetting, to spread it in the inner structure of the matrix to ensure a corrosion protection, and on the other hand to form the brazing meniscuses between the corrugation 4/sheet 5 and bar 6/sheet 5 junctions to ensure sealing and mechanical integrity of the matrix 2.

During the melting of the anticorrosion layer, a dense and protective coating 7 is formed on the surfaces of the corrugations 4, sheets 5 and bars 6 that isolates the substrate from its environment. The corrosion resistance is improved as a result, in particular for matrices 2 made from carbon steel.

The invention also covers a heat exchanger including a matrix 2 as described above. Such a heat exchanger is obtained by adding dispensing heads to the matrix 2 after stacking thereof. The assembly formed by the matrix 2 and the dispensing heads is placed in the brazing furnace to perform, in a single operation, the assembly of the heat exchanger and the corrosion protection of the matrix 2. If the material of the dispensing heads is not sufficiently corrosion-resistant, at least their inner surfaces in contact with a corrosive fluid are coated beforehand with a layer of anticorrosion suspension as defined above.

According to another alternative embodiment of a heat exchanger according to the invention, intermediate dispensing head connecting pieces are placed between the dispensing heads and the matrix 2. The assembly formed by the stack of corrugations 4, bars 6, separator sheets 5 and intermediate pieces is placed in the brazing furnace to perform the assembly of the unit and the corrosion protection of the matrix 2 therein, in a single operation. The intermediate pieces can be coated beforehand with a layer of anticorrosion suspension as defined above if their material is not sufficiently corrosion-resistant.

The separator sheets 5 are traditionally coated with braze material 3 on both of their faces. To strengthen the mechanical integrity of the brazed matrix 2 by consolidating the adherence between its components, a quantity of anticorrosion alloy contributing to the brazing can be placed on the brazing coating 3 of the separator sheets 5 in the form of a layer of anticorrosion suspension as defined above. This additional quantity or dual layer (layer of braze material+ anticorrosion layer) makes it possible to strengthen the bond between the separator sheets 5 and the corrugations 4.

According to another alternative, the braze material 3, which also acts as corrosion protection, can be deposited on the surface 9 of the separator sheets 5 or etched plates through a traditional deposition means. This alternative is advantageously used when it is necessary to use thicknesses of braze material 3 greater than around one hundred microns in order to guarantee the mechanical integrity of the matrix 2.

For heat exchanger matrices with etched plates, an alternative embodiment of the invention consists of etching plates not coated with braze material, then covering all of the plates with an anticorrosion layer, for example by immersion in a bath as described above. The anticorrosion coating 7 then performs both functions, i.e., corrosion protection and braze material for the assembly.

The anticorrosion layer can also be deposited by vaporization, then condensation of a metal phase on the surface of the elements to be coated, before stacking of the matrix 2, or chemically, as in a cementation process.

The present invention is particularly advantageous for heat exchanger matrices whose components are made from carbon steel or stainless steel.

The invention claimed is:

1. A method for manufacturing a brazed metallic matrix for a heat exchanger suitable for the circulation of a corrosive fluid within it, the matrix comprising a stack of components, some of said components defining channels for conveying said corrosive fluid, the method comprising:
  a) providing said components of the matrix-;
  b) depositing a layer of braze material on zones of said components to ensure the mechanical connection between the components;
  c) covering said channels with an anticorrosion layer by dipping said components in a liquid bath including an organic or aqueous solvent, a wetting agent and an anticorrosion alloy powder having a particle size of between 5 and 100 µm;
  d) stacking the components, thus forming the matrix;
  e) placing the stacked matrix in a brazing furnace; and f) having the matrix undergo a heat cycle, thus brazing the matrix and covering its fluid passages with an anticorrosion coating in a single operation, wherein the heat cycle comprises:

drying so as to allow the evaporation of the organic or aqueous solvent from the anticorrosion layer to form a precursor anticorrosion coating, said drying being carried out at a temperature between 350° C. and 500° C. for a predetermined drying time, and synthesizing the anticorrosion coating at a brazing temperature, between 950° C. and 1200° C.

2. The method according to claim 1, wherein the layer of braze material and the anticorrosion layer are made up of the same product.

3. The method according to claim 1, wherein the anticorrosion alloy powder is a powder of an alloy based on Nickel and Chromium.

4. The method according to claim 1, wherein the stack of components is a stack of etched plates or corrugations, of separator sheets and bars, or a combination of the two types of stack.

\* \* \* \* \*